United States Patent [19]

Hattori et al.

[11] Patent Number: 4,639,771
[45] Date of Patent: Jan. 27, 1987

[54] IMAGE PROCESSING SYSTEM

[75] Inventors: Yoshihisa Hattori; Nobuo Inoue, both of Tokyo, Japan

[73] Assignee: Kabushiki Kaisha Toshiba, Kawasaki, Japan

[21] Appl. No.: 792,867

[22] Filed: Oct. 30, 1985

[30] Foreign Application Priority Data

Oct. 31, 1984 [JP] Japan ................................ 59-227913

[51] Int. Cl.$^4$ .......................... H04N 1/46; H04N 9/74
[52] U.S. Cl. .......................................... 358/80; 358/27
[58] Field of Search ......................... 358/80, 75, 27, 22

[56] References Cited

U.S. PATENT DOCUMENTS

| | | | |
|---|---|---|---|
| 4,584,601 | 4/1986 | Suzuki | 358/80 |
| 4,597,006 | 6/1986 | Orsburn | 358/80 |
| 4,598,282 | 7/1986 | Pugsley | 358/80 |

OTHER PUBLICATIONS

"Digital Image Processing Technique", Intensive Basic Course in Electronics Techniques, supervised by Hideyuki Tamura and published by KK Japanese Industrial Technique Center, (K.K. Nippon Kogyo Gijutsu Center), Color Image Processing.

Primary Examiner—Howard W. Britton
Attorney, Agent, or Firm—Finnegan, Henderson, Farabow, Garrett & Dunner

[57] ABSTRACT

An image processing system has a density conversion table memory and a color conversion table memory. The density conversion table memory is addressed by first density pixel data of R, G and B components read out from an image memory, and generates second density pixel data predetermined as representative density pixel data of the first density pixel data. The color conversion table memory is addressed by the second density pixel data from the density conversion table memory, and generates color density pixel data, prepared in advance for color display, corresponding to the second density pixel data. The color density pixel data from the color conversion table memory is written in the image memory. When image display is preformed by utilizing the contents of the image memory, a color arrangement of a display image, different from that of the original image displayed by the first density image data, can be obtained.

3 Claims, 1 Drawing Figure

IMAGE PROCESSING SYSTEM

BACKGROUND OF THE INVENTION

The present invention relates to an image processing system having a color conversion function for an original image.

In order to create a multicolor image in a conventional image processing system having a color display function, an original document having an input pattern is prepared, and an operator must designate colors in units of dots at a key pad while he visually checks a display monitor. In another conventional coloring technique, a monochromatic image is entered by an input device such as a facsimile system or a TV camera, and the operator designates colors in units of dots by using a display monitor and a key pad.

In the conventional image processing system, therefore, pixel data must be entered in units of dots throughout the screen area, with patterning and coloring being time-consuming.

SUMMARY OF THE INVENTION

It is an object of the present invention to provide an image processing system which, by slight addition of hardware, can automatically and freely perform coloring and color patterning of an original image.

According to the present invention, the following effects can be obtained:

(1) Patterning and coloring of a multicolor image can be automatically performed to shorten the operation time.

(2) By updating the contents of a density conversion table memory and a color conversion table memory, color conversion can be freely performed. For example, (a) only a specific input color (including gradation) is designated (characteristic extraction), (b) only a specific color is designated as transparent (noise elimination), and (c) the color arrangement of the original input image can be modified (color arrangement conversion). In addition, coloring can be performed with representative colors of respective colors in the input image (arrangement color number conversion).

(3) A design pattern of the original image (a natural image) entered via a TV camera can be easily performed.

(4) An input color (i.e., a first density pixel data) corresponding to one pixel of the input image is not directly converted to a designated color, but is converted to a representative input color (i.e., a second density pixel data) by a density conversion table memory, thereby selecting an input color. Thereafter, the representative input color is converted by the color conversion table memory to the designated color (i.e., color density pixel data). Therefore, the memory capacity of the color conversion table memory can be decreased.

In order to achieve the above object of the present invention, there is provided an image processing system having an image memory for storing an input image as first density pixel data of red (R), green (G) and blue (B) components to perform image display in accordance with storage contents of the image memory, comprising:

a density conversion table memory addressed by the first density pixel data read out from the image memory, to generate second density pixel data predetermined as representative density pixel data of the first density pixel data;

a color conversion table memory addressed by the second density pixel data read out from the density conversion table memory, to generate color density pixel data prepared for color display in advance; and means for writing, in the image memory, the color density pixel data read out from the color conversion table memory.

BRIEF DESCRIPTION OF THE DRAWINGS

Other objects and features of the present invention will be apparent from the following description taken in connection with the accompanying drawings, in which.

DESCRIPTION OF THE PREFERRED EMBODIMENT

Figure 1:
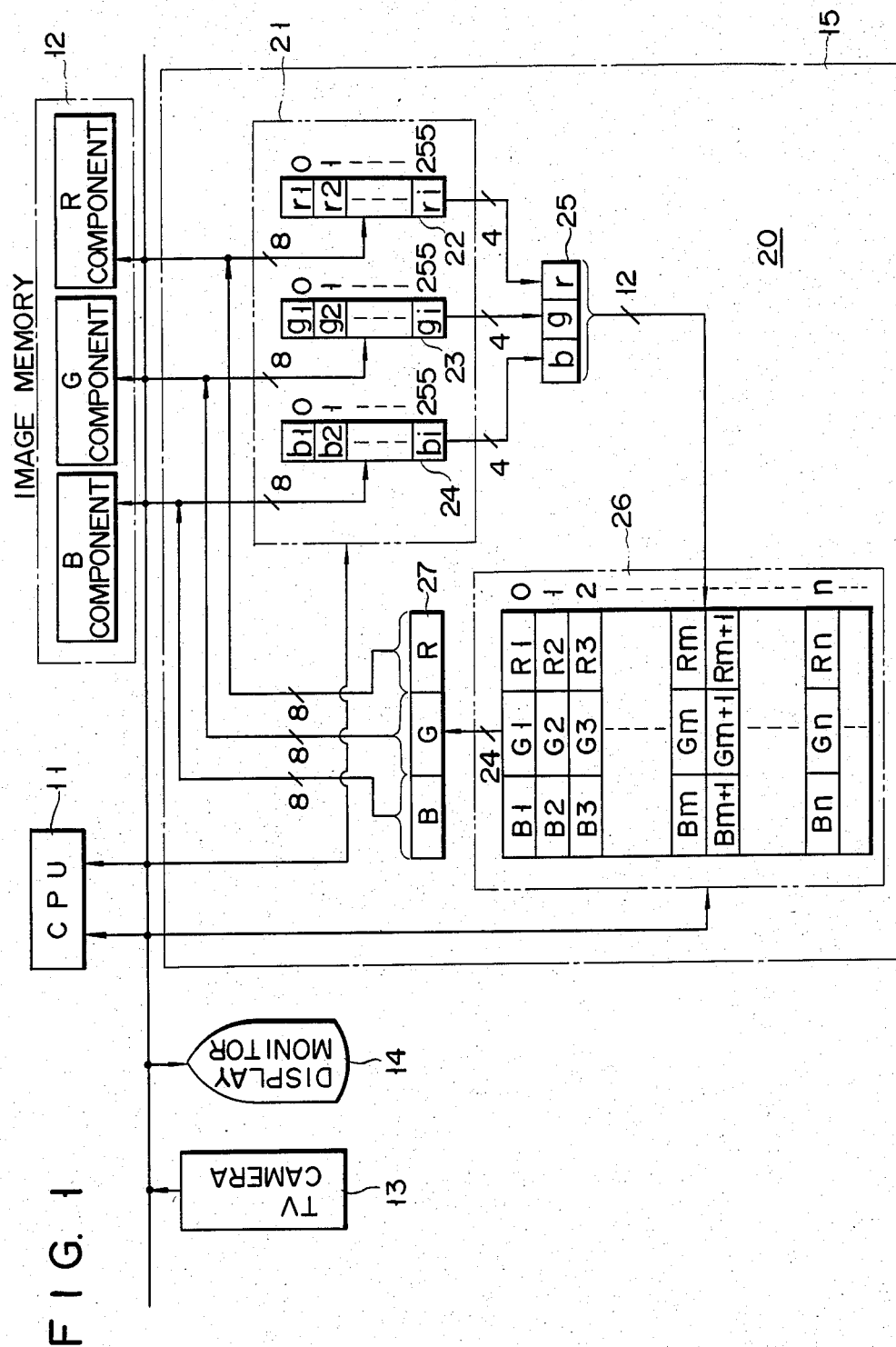
FIG. 1 is a block diagram of an image processing system according to an embodiment of the present invention.

Referring to FIG. 1, the image processing system of the present invention has a central processing unit (CPU) 11 for controlling the entire system, an image memory 12 for storing density pixel data of three primary color components (R, G and B), i.e., R, G and B component density pixel data each comprising 8-bit data, an image input device such as a TV camera 13 for input of image data, a display monitor 14 for displaying an image, and an image processor 15 for processing the image data. The CPU 11, the memory 12, the camera 13, the monitor 14 and the processor 15 are connected to each other through an image bus 16.

The processor 15 has a density conversion table memory 21 for converting R, G and B component density pixel data from the memory 12 into new R, G and B density pixel data. The memory 21 comprises an R density conversion memory 22 for converting the R component density pixel data from the memory 12 into new R component density pixel data, a G density conversion memory 23 for converting the G component density pixel data from the memory 12 into new G component density pixel data, and a B density conversion memory 24 for converting the B component density pixel data from the memory 12 into new B component density pixel data. In this embodiment, new R, G and B component density pixel data comprise four bits each.

The processor 15 also has an address register 25 for storing linked data of the R, G and B component density pixel data generated by the memory 21, and a color conversion table memory 26 for converting the R, G and B density pixel data stored in the register 25 into new R, G and B density pixel data which are prepared in advance to perform color display (designated color display) corresponding to the data stored in the register 25. The R, G and B density pixel data generated by the memory 26 comprise 8-bit R, G and B component density pixel data, respectively. In this embodiment, the memory 26 has a 4k-word capacity. The processor 15 further has a buffer register 27 for storing the R, G and B density pixel data from the memory 26 in units of color components. The memory 21, the register 25, the memory 26 and the register 27 constitute a color conversion logic 20. The internal arrangement of the processor 15, except for the logic 20, is omitted since it is not directly associated with the scope of the present invention.

The operation of the image processing system having the arrangement described above will now be described. An image of interest is picked up by the camera 13 and stored as the R, G and B component density pixel data in the memory 12. The contents of the memory 12 are displayed on the monitor 14, so that the input image is reproduced.

Coloring and color arrangement of the input image are performed in the following manner. The CPU 11 causes the memory 26 to store the preset color conversion table data. The R, G and B density pixel data (12 bits) of the input colors serve as address data to the memory 26. R, G and B density pixel data (24 bits) defined as designated colors corresponding to the input colors are stored at the respective addresses of the memory 26. The CPU 11 also causes the memory 21 to store the preset density conversion table data. The R, G and B component density pixel data (8 bits each) of the input colors serve as address data for the memories 22, 23 and 24 in the memory 21. Therefore, R, G and B component density pixel data (4 bits each) defined as the representative colors of the input colors are stored at the respective addresses of the memories 22, 23 and 24.

The CPU 11 energizes the processor 15 to enable the logic 20. The processor 15 is operated thusly in the following steps:

(i) The R, G and B component density pixel data are separately read out from the memory. The R component density pixel data from the memory 12 is supplied to the memory 22 in the memory 21. Similarly, the G and B component density pixel data are supplied to the memories 23 and 24, respectively, in the memory 21.

(ii) The memory 22 is addressed by the R component density pixel data from the memory 12, and generates new 4-bit R component density pixel data. Similarly, the memories 23 and 24 are addressed by the G and B component density pixel data from the memory 12, and generate new 4-bit G and B component density pixel data, respectively. The gradation levels (densities) of the R, G and B components are converted to new densities corresponding to the original densities. In other words, the input colors represented by the R, G and B density pixel data from the memory 12 are converted to representative colors defined in correspondence with the input colors. Therefore, by accessing the memory 21 in this embodiment, input colors are selected from about 1,600 input colors.

(iii) The new R, G and B density pixel data read out from the memory 21 are linked in a predetermined order, and the linked data is set in the register 25. 12-bit data from the register 25 is supplied as a look-up address to the memory 26.

(iv) The memory 26 is addressed in accordance with the contents of the register 25 and generates R, G and B density pixel data representing the designated colors defined in correspondence with the input colors selected by the memory 21. In other words, by looking up the memory 26, the selected input color is converted to the designated color.

(v) The R, G and B density pixel data read out from the memory 26 are set in the register 27. The contents of the register 27 are stored at addresses of the memory 12 for storing the density image data read out in step (i), in units of color components. The R, G and B pixel data in the memory 12, which correspond to any one of the pixels of the original image, are updated as the new R, G and B density pixel data converted by the logic 20.

(vi) The processor 15 repeats steps (i) through (v). When operations are completed for all pixels, the processor 15 supplies an end signal to the CPU 11.

The above operations constitute one cycle of color conversion for the input image. The color conversion results, as the contents of the memory 12, are displayed on the monitor 14, so that the operator can know the input pattern and coloring. If the desired pattern and color are not displayed on the monitor 14, the operator updates the color conversion table data or density conversion table data and the above color conversion process is repeated to obtain the desired image.

In the above embodiment, the image input device comprises the TV camera. However, a drum scanner or a facsimile system may be used as the image input device. The present invention can also be applied to a CAPTAIN (Character and Pattern Telephone Access Information Network) system or a general information input system.

What is claimed is:

1. An image processing system having an image memory for storing an input image as first density pixel data of red (R), green (G) and blue (B) components to perform image display in accordance with storage contents of said image memory, comprising:
    a density conversion table memory addressed by the first density pixel data read out from said image memory, to generate second density pixel data predetermined as representative density pixel data of the first density pixel data;
    a color conversion table memory addressed by the second density pixel data read out from said density conversion table memory, to generate color density pixel data prepared for color display in advance; and
    means for writing in said image memory the color density pixel data read out from said color conversion table memory.

2. A system according to claim 1, wherein said density conversion table memory comprises an R component pixel data density conversion table memory, a G component pixel data density conversion table memory, and a B component pixel data density conversion table memory.

3. A system according to claim 2, further comprising an address register for linking the R, G and B component image data density data from said R, G and B component image data density conversion table memories, to generate an address for accessing said color conversion table memory.

* * * * *